United States Patent
Dupy

[11] 3,758,740
[45] Sept. 11, 1973

[54] APPARATUS FOR SCARFING WELD BEADS

[76] Inventor: Jerome M. Dupy, 179 Ash St., Woodriver, Ill.

[22] Filed: Jan. 2, 1973

[21] Appl. No.: 320,182

Related U.S. Application Data

[62] Division of Ser. No. 200,564, Nov. 19, 1971.

[52] U.S. Cl. .................................. 219/67, 219/59
[51] Int. Cl. .................................... B23k 31/06
[58] Field of Search .................... 219/59, 67, 102, 219/104

[56] References Cited
UNITED STATES PATENTS
3,520,165   7/1970   Dodson .................................. 72/64
1,954,511   4/1934   Adams ................................... 29/33

Primary Examiner—R. F. Staubly
Assistant Examiner—Hugh D. Jaeger
Attorney—Robert H. Bachman, Paul Weinstein et al.

[57] ABSTRACT

A process and apparatus for scarfing a longitudinally extending weld bead on the outside surface of a welded metal tube. The process comprises peaking the tubing so that the major transverse tube axis is from about 5 to 40 percent longer than the minor transverse tube axis, followed by removal of the weld bead substantially flush with the outside surface of the tube. The process and apparatus is particularly applicable to tubing having a wall thickness to diameter ratio of 2½ percent or less and, more particularly, to copper or copper base alloy tubing. The apparatus includes means for peaking the tubing as aforenoted, the preferred means being the use of adjustable side enclosure rolls.

2 Claims, 8 Drawing Figures

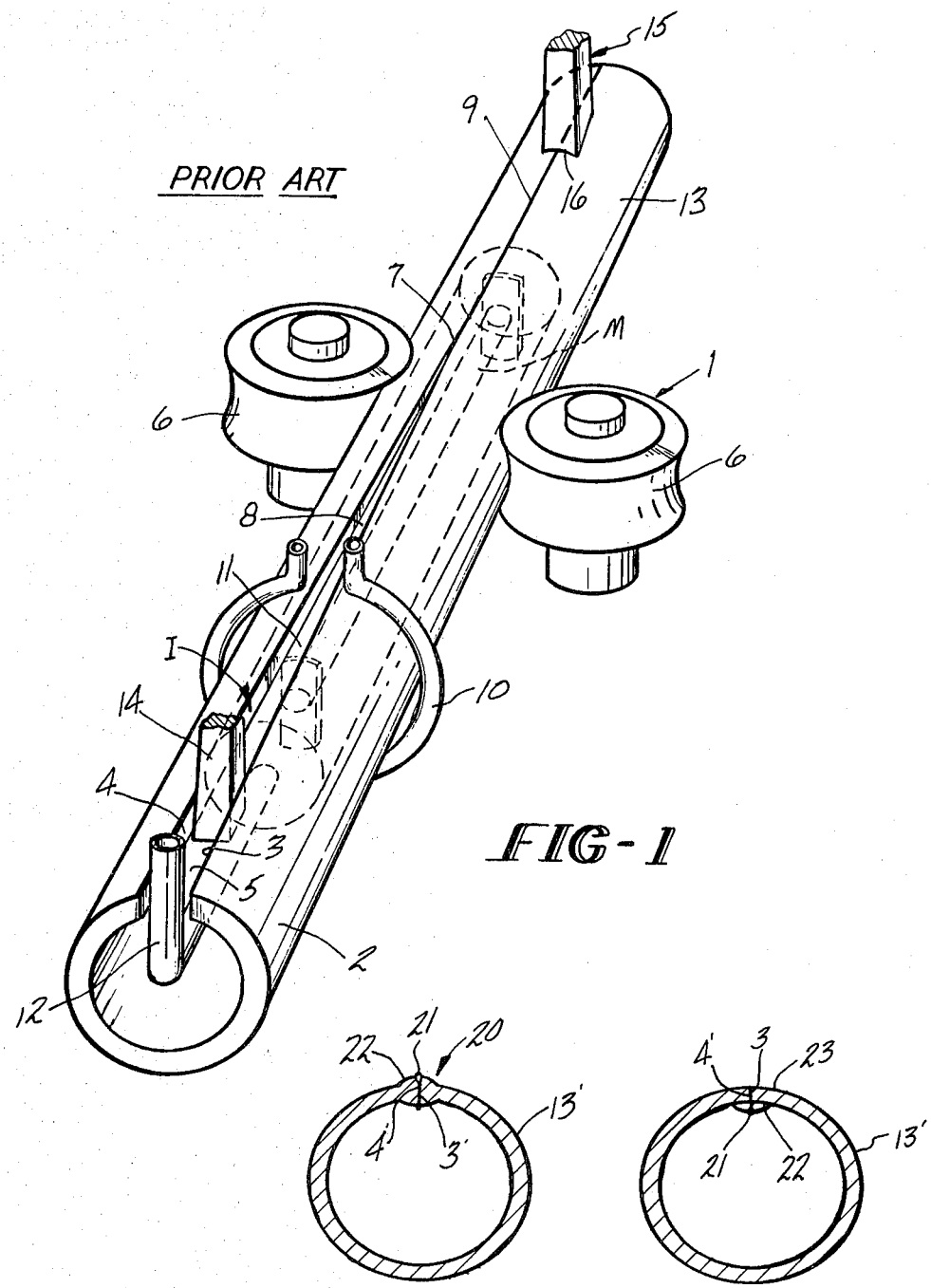

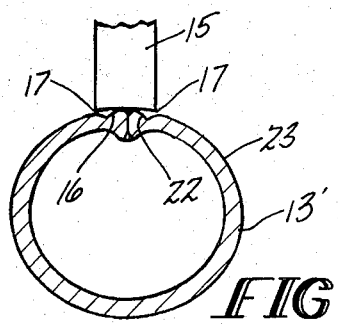
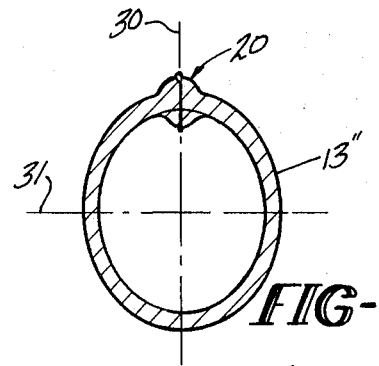
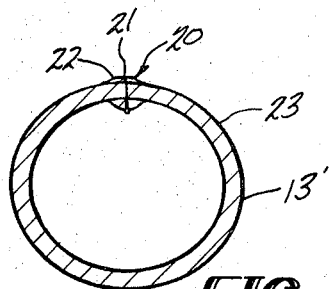
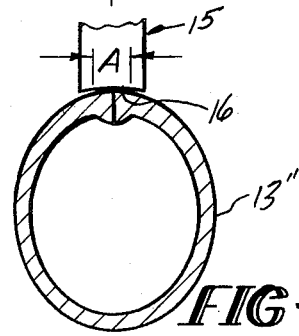
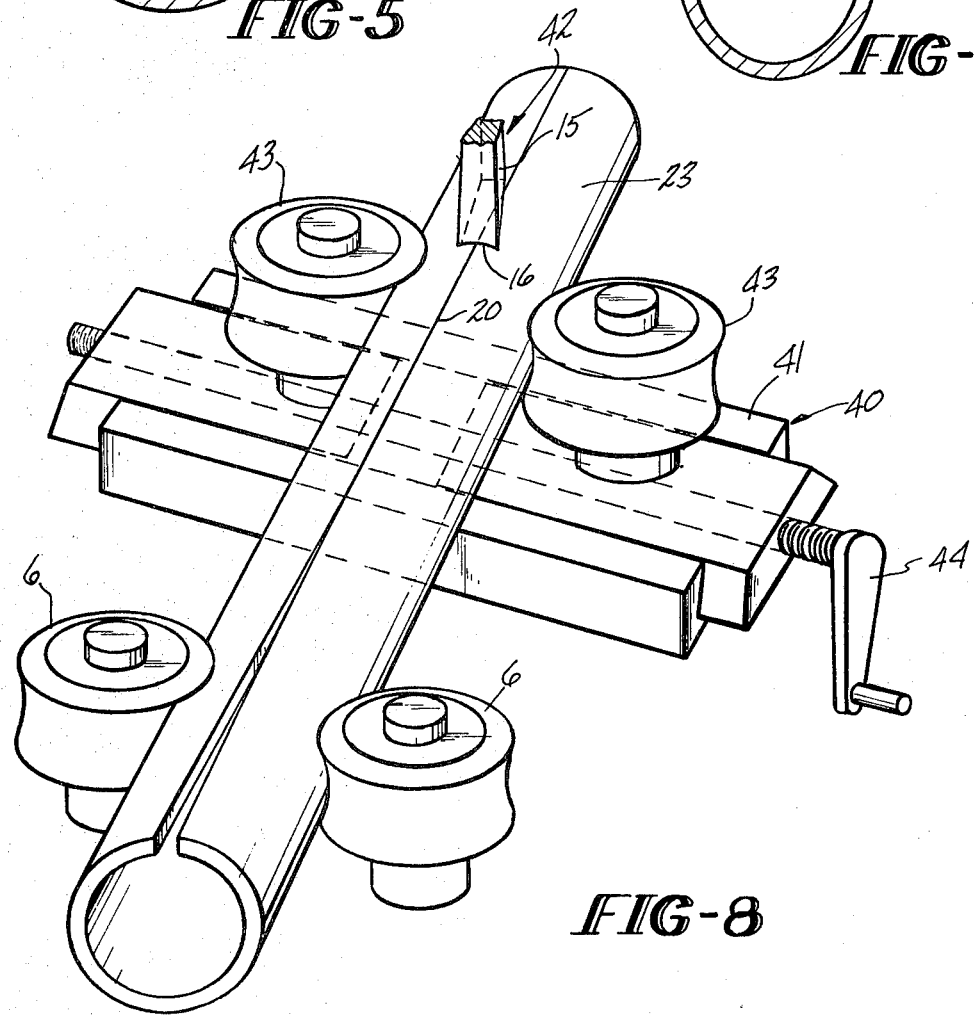

APPARATUS FOR SCARFING WELD BEADS

This is a divisional of application Ser. No. 200,564 filed Nov. 19, 1971.

BACKGROUND OF THE INVENTION

In the art of welding metal strip into tubing, it is known to use high frequency welding. A typical example of a prior art apparatus and process is set out in U.S. Pat. No. 3,037,105, granted May 29, 1962.

The welding process disclosed therein employs a forge welding technique wherein there is a reduction in the girth of the tubing at the weld rolls. This girth reduction squeezes out the molten metal from between the tube edges which are welded together forming a longitudinally extending weld bead on the outside and inside surfaces of the tube at the weld seam.

This invention is broadly directed to the removal of the weld bead from the outside surface of the tube by means of scarfing.

SUMMARY OF THE INVENTION

In accordance with this invention, it has been found that the scarfing of the weld bead from the outside surface of thin wall tubing cannot be performed satisfactorily by known techniques wherein a cutting tool is urged against the tubing after it has emerged from the weld rolls to scarf off the weld bead. It has been found that for thin wall tubing, particularly tubing having a wall thickness to diameter ratio of 2½ percent or less, that the pressure of the outside diameter scarfing tool on the tube surface deforms the tube, thereby leaving a slight unscarfed ridge of weld bead on the outside surface.

In accordance with this invention, it has been found that this problem can be substantially eliminated by first peaking the tubing, as by means of a pair of squeeze rolls positioned before the scarfing tool. The tubing as peaked is sufficiently strong to keep it from being deformed by the O.D. scarfing tool resulting in a good clean smooth surface.

Further, the scarfing tool removes only a minimum width of scarf and adjacent surface, thereby yielding tubing having a superior surface finish, with the scarf removal area blending smoothly into the outside surface of the tube.

It is accordingly a principal object of this invention to provide a process and apparatus for scarfing the weld bead from the outside surface of a welded tube wherein the tubing is peaked prior to scarfing so that it will not be deformed under the action of the scarfing tool.

It is another object of this invention to provide a process and apparatus as above, wherein the major transverse axis of the tubing intersects the weld bead and is from 5 to 40 percent longer than the minor transverse axis of the tubing.

It is a further object of this invention to provide a process and apparatus as above, wherein the tubing has a wall thickness to diameter ratio of 2½ percent or less.

It is a further object of this invention to provide a process and apparatus as above, wherein the tubing is formed of copper or a copper base alloy.

Other objects and advantages will become apparent from the following description and drawings.

BRIEF DESCRIPTION OF THE DRAWINGS

FIG. 1 is a schematic view of a typical prior art high frequency welding apparatus with which the process of this invention may be carried out.

FIG. 2 is a cross sectional view of an as-welded tube.

FIG. 3 is a cross sectional view of an as-welded tube after scarfing of the outside diameter weld bead.

FIG. 4 is a cross sectional view of the as-welded tubing at the scarfing tool station illustrating the deformation of the tubing by the scarfing tool.

FIG. 5 is a cross sectional view of the tubing of FIG. 4 after the outside diameter weld bead has been scarfed.

FIG. 6 is a cross sectional view of an as-welded tube peaked in accordance with this invention.

FIG. 7 is a cross sectional view of an as-welded tube peaked in accordance with this invention at the scarfing tool station.

FIG. 8 is a perspective view of a typical apparatus for peaking the welding tubing in accordance with the process of this invention.

DETAILED DESCRIPTION

Referring now to the drawings and especially to FIG. 1, there is illustrated a typical welding apparatus 1 for welding metal strip in the form of a preformed open tube 2 into tubing. The apparatus is adapted to weld together the opposed edges 3 and 4 which form the longitudinal gap 5 in the open metal tubing 2.

The open tube 2 is formed in a forming mill (not shown) situated in line immediately preceding the apparatus 1. The forming mill is of conventional well known design. The forming mill may contain a plurality of roll stands or dies which form metal strip into the open tube 2. It is to be understood that other roll stands may be situated in line immediately following the apparatus 1 to further shape or size the tubing such as, for example, to correct out of roundness. The roll stands are generally power driven and, therefore, provide means for rapidly and longitudinally advancing the tubing. Alternatively, this means may be power driven weld rolls 6 as shown.

The weld rolls 6 comprise a pair of pressure rolls of known form which engage the opposite sides of the tube 2 and cause the longitudinally extending gap 5 therein to become closed substantially at a weld point 7 forming a V shaped gap 8. As the open tubing 2 advances to the weld point 7, the edges 3 and 4 at the gap 8 become welded together along the weld seam 9.

The edges 3 and 4 at the V shaped gap 8 are heated by means of an induction coil 10 or contacts. The induction coil 10 shown is a single turn coil; however, a multiturn coil or other appropriate device could be substituted for the single turn coil.

The coil 10 is formed of wrought metal tubing. The coil is electrically connected to a source of high frequency current, not shown. The high frequency current is normally at least 10 kilocycles per second and, preferably, at least 100 kilocycles per second or higher. The coil is also connected to a source of cooling medium (not shown) which flows through the tubing to keep it from overheating.

The apparatus 1 may also include the following elements as shown in FIG. 1. An impeder I may be included to improve the efficiency of the induction coil 10 by increasing the impedance of the high frequency current paths around the back of the open tube 2. This reduces the flow of current around the back of the tube 2 and increases the flow of current along the tube edges 3 and 4 running from a point on the tube edge 3 adjacent the coil 10 to the weld point 7 and back the opposing tube edge 4 to a point adjacent the coil 10. This results in more efficient heating of the edges 3 and 4 of the open tube 2, the edges being heated up to the welding temperature upon reaching the weld point 7.

The impeder I may be of any suitably known construction and comprises a schroud 11 connected to a hollow supporting arm 12 as shown extending down through the gap 8. The actual shape of the schroud 11 shown in FIG. 1 is merely schematic and it may have any suitable shape.

A source of cooling medium (not shown) such as water is connected to the hollow supporting arm 12 for flowing water into the schroud 11 and about a core of magnetic material M which is held therein. The magnetic material in the core should be of an insulating nature to provide a core substantially free of eddy current losses. The core is preferably a sintered magnetic oxide insulating material, preferably of types now well known which have a low loss factor and high volume resistivity. A suitable material is marketed under the name "Ferramic" by General Ceramic and Steatite Corporation, the permeability thereof being substantially greater than unity. The cooling medium which passes through the hollow supporting arm 12 flows within the schroud 11 and about the Ferramic core M to cool the core and is generally discharged within the welded tube 13.

Further, since the angle of the V shaped gap 8 is important, a seam guide means 14 is generally included at a point in advance of the induction coil 10 to accurately space apart the edges of the tube 2 and, thereby, obtain the desired angle. The seam guide means may be formed of a suitable insulating material protruding down into the gap so that the roll stand preceding that position (not shown) will cause the tube gap edges 3 and 4 to be pressed against the opposite sides of the seam guide 14 whereby the edges are maintained with a uniform separation.

It is known as shown in FIG. 1 to employ a scarfing tool 15 to remove the weld bead and any upset metal from the outside surface of the tube 13. The scarfing tool 15 generally comprises a tool bit whose cutting edge 16 conforms to the contour of the outer surface of the welded tube 13. The scarfing tool 15 is adjustably mounted in any suitably known way, not shown, which permits its position relative to the tubing 13 to be changed so that the amount of metal removal and alignment of the tool may be adjusted.

As shown, the scarfing tool generally follows in line the weld rolls and precedes in line the sizing or shaping roll stands not shown.

The welding apparatus just described is but one type of apparatus useful with the instant invention and numerous other high frequency welding apparatus are known which could be employed in place thereof.

As shown in FIG. 2, the as-welded tubing 13' in accordance with this invention preferably has a flat oval cross section although it may have any desired cross sectional shape. The weld bead 20 as shown comprises a bead portion 21 and an upset metal portion 22. The bead portion 21 is formed by the molten metal which is squeezed out from between the tube edges 3' and 4' as the welding takes place. The upset portions 22 result from the girth reduction at the weld rolls which causes the strip edges 3' and 4' adjacent the weld bead 20 to be upset and deformed as shown.

In accordance with this invention, it is desired to remove the entire weld bead 20 comprising the bead 21 and upset 22 portions substantially flush with the outer surface 23 of the welded tube 13' as shown in FIG. 3. When the wall thickness to diameter ratio is large, generally greater than 2½ percent, the scarfing process and apparatus of the prior art as shown in FIG. 1 are adequate to obtain the desired scarfed tubing 13' shown in FIG. 3. However, when thin wall tubing 13' is scarfed by conventional means, namely, tubing having a wall thickness to diameter ratio of 2½ percent or less, it is subject to partial collapse under the influence of the scarfing tool 15 as shown in FIG. 4.

Under such conditions, only a portion of the weld bead 20 is removed leaving, as shown in FIG. 5, a portion of the bead 21 and upset 22 portions remaining on the surface 23 of the tube after scarfing has been completed. The tubing 13' of FIG. 5 is unacceptable for further processing. In normal practice, the tubing 13' after scarfing of the outside diameter weld bead passes through sizing and/or shaping roll stands. In order for these sizing and shaping operations to be properly performed, the outer surface 23 of the tube must be smooth. The presence of a raised weld bead 20 as shown in FIG. 5 makes it impossible to properly carry out these sizing and shaping operations.

Referring again to FIG. 4, the scarfing tool 15 cutting edge 16 comforming as it does to the outside surface 23 contour of the as-welded tube 13' cuts a wide scarfing area and when the tube is subject to partial collapse as shown therein the edges 17 of the scarfing tool 15 may actually cut grooves or otnerwise scratch the outer surface 23 of the tubing yielding an undesirable surface finish.

In accordance with this invention, the problems illustrated in FIG. 5 are substantially overcome by peaking the tubing 13' prior to scarfing. By peaking it is meant that the major transverse axis 30 of the tubing 13' intersects the weld bead 20. FIG. 6 shows a cross section of the as-welded tubing 13'' after peaking in accordance with this invention but prior to scarfing. The major transverse axis 30 of the tubing 13'' which intersects the weld bead should be from about 5 to 40 percent longer than the minor transverse axis 31 of the tubing and, more preferably, the major transverse axis 30 is from 20 to 30 percent longer than the minor transverse axis 31 of the tubing 13'.

As shown in FIG. 7, the peaked tubing 13' in accordance with this invention is not subject to partial collapse even when the thickness to diameter ratio of the tubing is 2½ percent or less. Further, as shown in FIG. 7, the cutting edge 16 of the scrafing tool 15 is shaped to conform to the surface of the tubing 13'' after sizing and shaping, for example, for circular tubing it would have a circular shape. In consequence, therefore, a very narrow scarf removal area A is produced because the peaked tube 13'' contacts only a narrow portion of the scarfing tool 15 cutting edge. This provides improved surface finish in the final tubing.

FIG. 8 shows a typical apparatus 40 for carrying out this invention. The apparatus is shown in line following the weld rolls 6. It comprises means 41 for peaking the tubing 13'' and means 42 for scarfing the weld bead 20 from the outside surface 23 of the tubing. The peaking means 41 shown in FIG. 8 comprises a pair of adjustable side enclosure rolls 43. The spacing between the rolls 43 may be adjusted by means of a crank 44. The narrower the spacing the greater is the amount of peaking. The peaking means 41 shown is merely exemplary and other means for accomplishing the peaking could be employed such as, for example, the use of dies or the like.

The scarfing means 42 shown comprises a scarfing tool 15 adjustably held by conventional means, not shown, which do not form a part of the invention herein. It is preferred, however, in accordance with this invention that the cutting edge 16 of the scarfing tool 15 has a radius which substantially corresponds to the radius of the tubing after shaping and sizing for circular tubing and for noncircular tubing that the cutting edge conform to the surface contour of the tubing.

While this invention is broadly applicable to all types of welded metal tube, it is preferred for use with copper and copper base alloy welded tubing with which the problem of collapse under the action of the scarfing tool is greatest.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. In an apparatus for welding metal strip into tubing and for removing a longitudinally extending weld bead from the outer surface of said tubing, said apparatus comprising means for welding said strip into tubing and means for scarfing said weld bead substantially flush with the outside surface of said tubing, the improvement wherein: said apparatus includes means for peaking said tubing so that the major transverse tube axis is from about 5 percent to about 40 percent longer than the minor transverse tube axis, said peaking means contacting said tubing and being located intermediate said welding means and said scarfing means and in such relation to said scarfing means that the tube is in the peaked condition upon being scarfed.

2. In an apparatus as in claim 1, the further improvement wherein said scarfing means includes a tool bit whose cutting edge conforms to the surface contour of the desired tubing.

* * * * *